US009479687B2

United States Patent
Chien et al.

(10) Patent No.: US 9,479,687 B2
(45) Date of Patent: Oct. 25, 2016

(54) ELECTRONIC DEVICE AND IMAGE COMPOSING METHOD

(71) Applicant: Chiun Mai Communication Systems, Inc., New Taipei (TW)

(72) Inventors: How-Wen Chien, New Taipei (TW); Yi-Yun Hung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/695,854

(22) Filed: Apr. 24, 2015

(65) Prior Publication Data

US 2016/0165121 A1    Jun. 9, 2016

(30) Foreign Application Priority Data

Dec. 5, 2014   (CN) .......................... 2014 1 0737311

(51) Int. Cl.
*H04N 5/262* (2006.01)
*H04N 5/232* (2006.01)
*H04N 5/225* (2006.01)

(52) U.S. Cl.
CPC ........ *H04N 5/23206* (2013.01); *H04N 5/2258* (2013.01)

(58) Field of Classification Search
CPC ............... H04N 5/262; H04N 5/2628; H04N 2005/2726; H04N 7/181; H04N 5/232; H04N 5/247
See application file for complete search history.

(56) References Cited

U.S. PATENT DOCUMENTS

| | | | | |
|---|---|---|---|---|
| 7,102,670 B2 * | 9/2006 | Seaman | ................. | H04N 5/772 348/231.2 |
| 9,002,057 B2 * | 4/2015 | Outtagarts | ......... | G06K 9/00771 348/139 |
| 2015/0145952 A1 * | 5/2015 | Hirata | ................ | H04N 5/23206 348/38 |
| 2015/0278988 A1 * | 10/2015 | MacMillan | ........... | G06T 3/0068 348/218.1 |

* cited by examiner

*Primary Examiner* — Tuan Ho
(74) *Attorney, Agent, or Firm* — Zhigang Ma

(57) ABSTRACT

An image composing method searches other electronic devices nearby via a communication unit, selects a number of electronic devices from the searched other electronic devices to determine slave members of a sharing community, and selects a number of slave members from the slave members of the sharing community to be capturing devices. The method identifies an object, determines a capturing position of each capturing device according to the object, the number of the capturing devices, and a predetermined manner, and controls each capturing device to move to a corresponding capturing position. The method further instructs each capturing device to take image according to the predetermined manner and receives the image from each capturing device, and integrates the images taken by the capturing devices to generate a single composed image. A related electronic device and a related non-transitory storage medium are also provided.

20 Claims, 7 Drawing Sheets

ELECTRONIC DEVICE AND IMAGE COMPOSING METHOD

CROSS-REFERENCE TO RELATED APPLICATIONS

This application claims priority to Chinese Patent Application No. 201410737311.6 filed on Dec. 5, 2014, the contents of which are incorporated by reference herein.

FIELD

The subject matter herein generally relates to imaging.

BACKGROUND

To compose an image, such as a multi-angle image or a high definition image, a camera needs to take images of an object several times and the images taken by the camera need to be processed via a computer.

BRIEF DESCRIPTION OF THE DRAWINGS

Implementations of the present technology will now be described, by way of example only, with reference to the attached figures, wherein.

DETAILED DESCRIPTION

Figure 1:
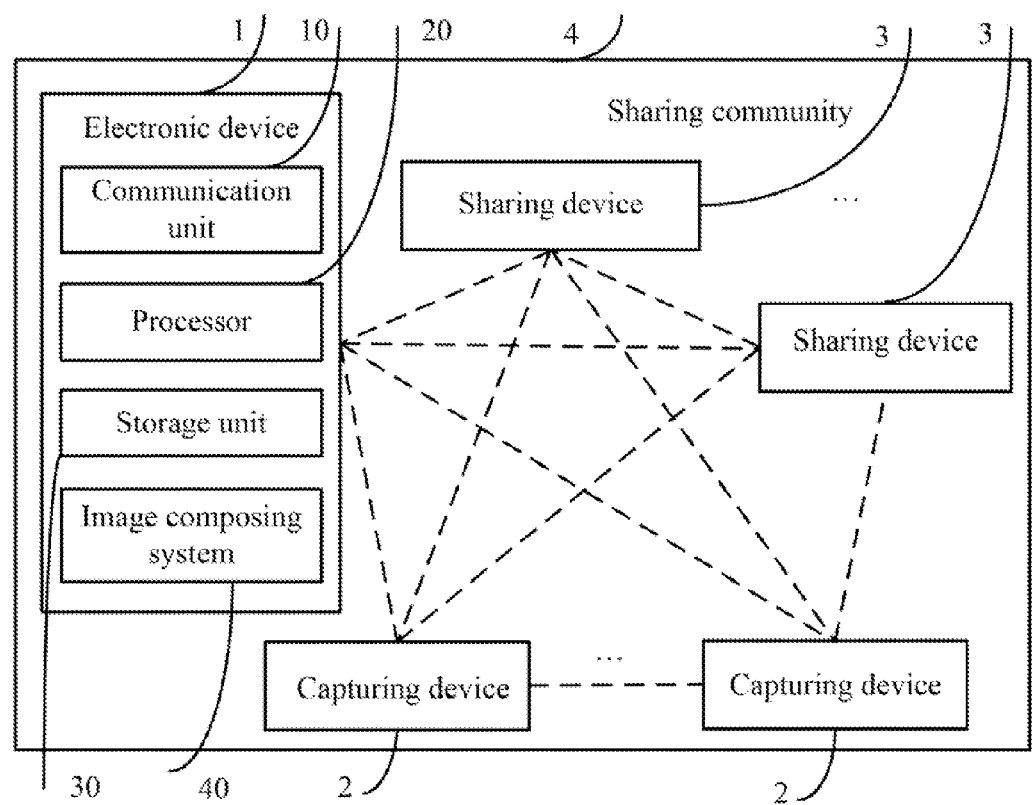
FIG. 1 illustrates a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The term "comprising" means "including, but not necessarily limited to"; it specifically indicates open-ended inclusion or membership in a so-described combination, group, series and the like.

Embodiments of the present disclosure will be described with reference to the accompanying drawings.

FIG. 1 illustrates a block diagram of an embodiment of an electronic device 1. The electronic device 1 can include a communication unit 10. The communication unit 10 can enable the electronic device 1 to communicate with other electronic devices. In the embodiment, the communication unit 10 can be a wireless unit, such as a WIFI unit, a radio communications unit, a BLUETOOTH unit, an IR communications unit, or other types of direct communications unit. In the embodiment, other electronic devices can each have another communication unit. The electronic device 1 and the other electronic devices can form a sharing community 4, and the electronic devices 1 can be members of the sharing community 4. In the embodiment, the electronic device 1 can be a master member of the sharing community 4, and other electronic devices can each be a slave member of the sharing community 4. Each electronic device 1 can include information, such as an identity (e.g. Ann). Each member of the community can also include information. The information of each member can be the same as the information of a corresponding electronic device. Each other electronic device can be an electronic device capable of capturing an image of an object (hereinafter capturing device) 2 or an electronic device capable of sharing the image (hereinafter sharing device) 3. In the embodiment, the electronic device 1 and the sharing devices 3 can be portable electronic devices, such as smartphones, tablet computers, laptops, computers, wearable devices, or combinations thereof. The capturing devices 2 can be portable electronic devices with image capturing units, such as smartphones, tablet computers, digital cameras, or combinations thereof.

The electronic device 1 can control, via the communication unit 10, each capturing device 2 to capture an image of an object in a predetermined manner. In the embodiment, the electronic device 1 can transmit an image-capturing command to each capturing device 2 via the communication unit 10, to control each capturing device 2 to capture an image of the object in the predetermined manner. The electronic device 1 can further receive the image from each capturing device 2 via the communication unit 10, compose the images taken by the capturing devices 2 to generate a composed image, and transmit the composed image to the capturing devices 2 and the sharing devices 3, to share the composed image with the capturing devices 2 and the sharing devices 3. Each capturing device 2 can receive the image-capturing command from the electronic device 1, control the capturing unit to capture an image of the object in the predetermined manner according to the image-capturing command, and transmit the image to the electronic device 1 via the communication unit thereof. Each sharing device 3 can receive the composed image from the electronic device 1.

In the embodiment, the predetermined manner can be a first predetermined manner and/or a second predetermined manner. In the first predetermined manner, the electronic device 1 can control each capturing device 2 to take an image of the object from a different angle (e.g. two capturing devices respectively taking an image of the front 90 degrees and an image of the left 60 degrees), wherein the images taken by all capturing devices 2 can cooperatively show the object in a specific range of angles, such as a 360-degree view of the object or a 180-degree view of the object, thus, a multi-angle image can be obtained in the first predetermined manner. In the embodiment, the specific range of angles of the object can be a default or set by a user. In the second predetermined manner, the electronic device 1 can control each capturing device 2 to capture a different part of the object (e.g. the capturing devices taking images of an upper part of the object, a lower left part of the object, and a lower right part of the object), wherein the parts of the object in the images taken by all capturing devices 2 can cooperatively form an integrated whole, thus, a high definition image can be obtained in the second predetermined manner.

Figure 2:
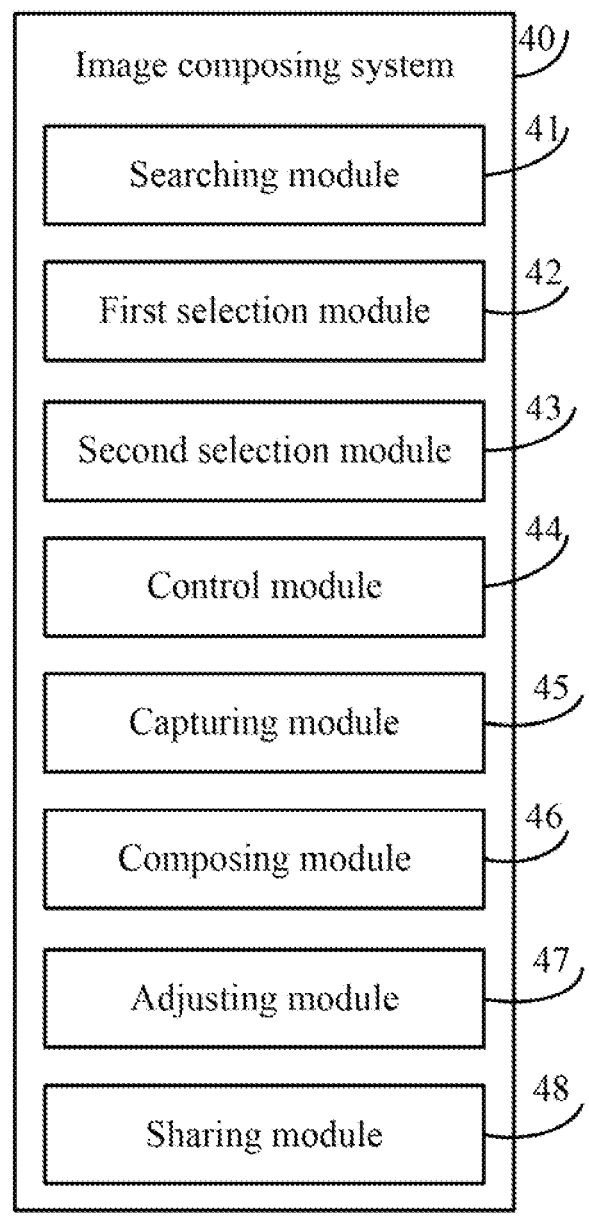
FIG. 2 illustrates a block diagram of an embodiment of an image composing system.

In the embodiment, the electronic device 1 can include a processor 20 and a storage unit 30. In the embodiment, the electronic device 1 can further include an image composing system 40. FIG. 2 illustrates a block diagram of an embodiment of an image composing system 40. In the embodiment, the image composing system 40 can include a searching module 41, a first selection module 42, a second selection module 43, a control module 44, a capturing module 45, and a composing module 46. One or more programs of the function modules of the image composing system 40 can be stored in the storage unit 30 and executed by the processor 20. The processor 20 can be a central processing unit, a digital processor, or a single chip, for example. The storage unit 30 can be a hard disk, a compact disk, or a flash memory, for example.

In the embodiment, the searching module 41 can be configured to search other electronic devices nearby via the communication unit 10. In the embodiment, the communication unit 10 can be a BLUETOOTH unit. The searching module 41 can be configured to search the other electronic devices with a discoverable BLUETOOTH unit nearby.

In the embodiment, the first selection module 42 can be configured to select a number of electronic devices from the searched other electronic devices to determine slave members of the sharing community 4. In such embodiment, the sharing community 4 can be created after the electronic devices are selected from the searched other electronic devices. In other embodiments, the sharing community can be pre-created before searching the other electronic devices nearby. In the embodiment, the first selection module 42 can be configured to transmit an invitation request to each selected electronic device to request each selected electronic device to join in the sharing community 4. The first selection module 42 can be further configured to receive an invitation feedback from each selected electronic device, and determine which selected electronic devices send back agreement invitation feedbacks to be the slave members of the sharing community 4. In other embodiments, the invitation to the selected electronic devices is omitted and the first selection module 42 can directly determine the selected electronic devices to be slave members of the sharing community 4. For example, the first selection module 42 can transmit a message to each selected electronic device to prompt that the corresponding electronic device is selected to be the slave member of the sharing community 4. In the embodiment, the first selection module 42 can be further configured to transmit an image-receiving request, including information of all the slave members of the sharing community 4, to each slave member of the sharing community 4, to request all the salve members in the sharing community 4 to receive the images from each other. The first selection module 42 can be further configured to provide options, such as agreeing option and disagreeing option, for each slave member to determine whether or not to receive the images from the other slave members of the sharing community 4.

In the embodiment, the second selection module 43 can be configured to select a number of slave members from the slave members of the sharing community 4 to be capturing devices 2. In the embodiment, the second selection module 43 can be configured to transmit an image-capturing request to the selected slave members, to request each selected slave member to take image. The second selection module 43 can be further configured to receive image-capturing feedbacks from each selected slave member, and determine which slave members send back agreement image-capturing feedbacks to act as capturing devices 2. In an alternative embodiment, without transmitting the image-capturing request to the selected slave members, the second selection module 43 can be configured to directly determine the selected slave members to be capturing devices 2. For example, the second selection module 43 can merely transmit a message to each selected slave member to prompt that the corresponding slave member is selected to be the capturing device 2.

In the embodiment, the control module 44 can be configured to identify the object according to information of the object, determine a capturing position of each capturing device 2 for each capturing device 2 to capture the image according to the object, the number of the capturing devices 2, and the predetermined manner, wherein each of the capturing positions is different to create a different image. The control module 44 can be further configured to control each capturing device 2 to move to the corresponding capturing position via the communication unit 10. In the embodiment, the control module 44 can control each capturing device 2 to move to the corresponding capturing position by adjusting the zooming and the focus on the object such that the images captured by the capturing devices 2 have correct and consistent object size and focus. Alternatively, the control module 44 can control each capturing device 2 to move to the corresponding capturing position by controlling each capturing device 2 to display guiding information such that the owner of each capturing device 2 can follow the guiding information to move each capturing device 2 to the corresponding capturing position. In the embodiment, the information of the object can be inputted by the user or obtained according to a signal received from an electronic device which is taken along with the object. The information of the object can be a character with some features (e.g. a girl with red clothes) who uniquely appears in the sight of the capturing devices 2, or an ornament or flower which uniquely appears in the sight of the capturing devices 2, or a location of an object near the capturing devices 2 (e.g. a set of coordinates (300, 298)), or the like. In the embodiment, the predetermined manner can be default, or inputted, or selected by the user.

In detail, in the first predetermined manner, the control module 44 can be configured to identify the object according to information of the object, divide the specific range of angles by the number of the capturing devices 2 to determine a capturing angle of each capturing device 2, determine the capturing position of each capturing device 2 according to the capturing angle of each capturing device 2 and the object, and further control each capturing device 2 to move to the corresponding capturing position via the communication unit 10. For example, in the first predetermined manner, suppose that the object is a boy wearing blue clothes and four capturing devices A, B, C, and D are employed; the control module 44 determines that the object is the boy wearing blue clothes, and determines that the capturing positions of the capturing devices A, B, C, and D can be respectively a front of the boy wearing blue clothes, a right side of the boy wearing blue clothes, a back of the boy wearing blue clothes, and a left side of the boy wearing blue clothes. The control module 44 further transmits a signal to the capturing devices A, B, C, and D via the communication unit 10 to control capturing devices A, B, C, and D to respectively move to the capturing positions: the front of the boy wearing blue clothes, the right side of the boy wearing blue clothes, the back of the boy wearing blue clothes, and the left side of the boy wearing blue clothes.

In the second predetermined manner, the control module 44 can be configured to identify the object according to the information of the object, divide the object by the number of the capturing devices 2 to determine a capturing part of each capturing device 2, determine the capturing position of each capturing device 2 according to the capturing part of each capturing device 2 and the object, and further control each capturing device 2 to move to the corresponding capturing position via the communication unit 10. For example, in the second predetermined manner, suppose that the object is a boy wearing red clothes and four capturing devices E, F, G, and H are employed; the control module 44 determines that the object is the boy wearing red clothes, and determine that the capturing positions of the capturing devices E, F, G, and H are, in pairs, a left side of the body wearing red clothes and a right side of the body wearing red clothes, to respectively capture an upper left portion of the boy wearing red clothes, an upper right portion of the boy wearing red clothes, a lower left portion of the boy wearing red clothes, and a lower right portion of the boy wearing red clothes. The control module 44 further transmits a signal to the capturing devices E, F, G, and H via the communication unit 10 to control the capturing devices E, F, G, and H to move to the corresponding capturing position: capturing devices E and G to the left side of the body wearing red clothes, and capturing devices F and H to the right side of the body wearing red clothes.

In the embodiment, the capturing module 45 can be configured to instruct each capturing device 2 to take the image according to the predetermined manner and receive the image from each capturing device 2 via the communication unit 10. In the first predetermined manner, the capturing module 45 can be configured to instruct each capturing device 2 to capture an image from a corresponding capturing angle via the communication unit 10. In the second predetermined manner, the capturing module 45 can be configured to instruct each capturing device to capture an image of a certain part of the object via the communication unit 10. In the embodiment, the capturing module 45 can be configured to transmit the image-capturing command (e.g. a command for capturing after 2 minutes) to each capturing device 2 via the communication unit 10, to control each capturing device 2 to take image simultaneously. In the embodiment, the capturing module 45 can be further configured to control each capturing device 2 to name the image in a default rule, thus the electronic device 1 can determine which images originate from which capturing device 2. For example, the images taken by the capturing device A are named A1 . . . AN, thus the capturing module 45 can determine that the image A1 is taken by the capturing device A.

Figure 3:
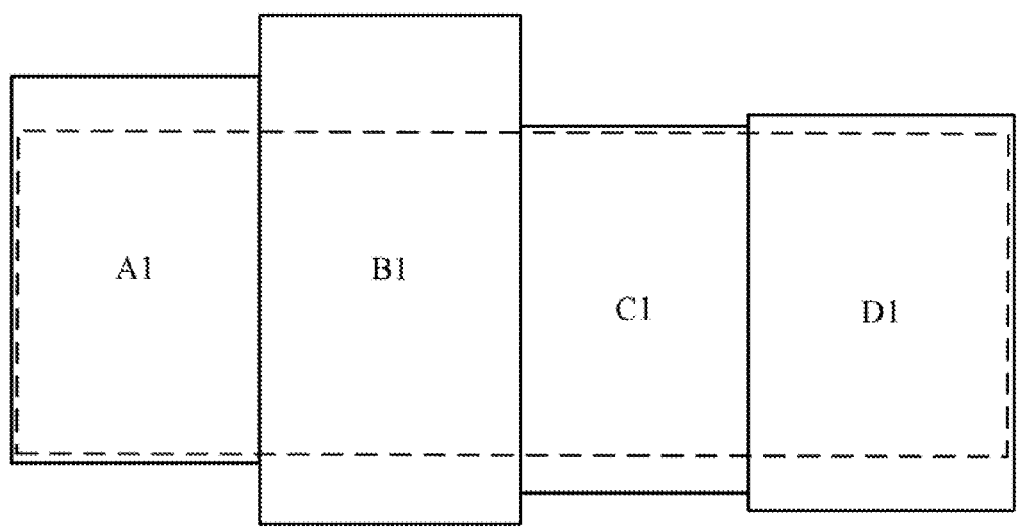
FIG. 3 illustrates a diagrammatic view of a principle in composing a number of images into a single multi-angle image.

In the embodiment, the composing module 46 can be configured to integrate the images taken by the capturing devices 2 to generate the composed image. In detail, in the first predetermined manner, in the embodiment, the composing module 46 can be configured to stitch the images together with their neighboring images side by side in orientation to obtain the still multi-angle image. In the embodiment, the composing module 46 can be further configured to crop the stitched image in a preset manner to generate the still multi-angle image. For example, in FIG. 3, an image A1 is taken by the capturing device A, an image B1 is taken by the capturing device B, an image C1 is taken by the capturing device C, and an image D1 is taken by the capturing device D. The composing module 46 stitches the image A1, the image B1, the image C1, and the image D1 together into a single image, and crops the stitched image by cutting the stitched image along the dashed line to generate a rectangular still multi-angle image. In other embodiments, the composing module 46 can be configured to select one image from all the images taken by the capturing devices 2 and compose the other images taken by the capturing devices 2 sequentially in the orientation order into the selected image to form the dynamic multi-angle image. Thus, the dynamic multi-angle image can sequentially display the images in the orientation order at a time interval or in response to user operation (e.g. pressing a key of the electronic device). In the embodiment, the orientation order can be from left to right and from front to back.

Figure 4:
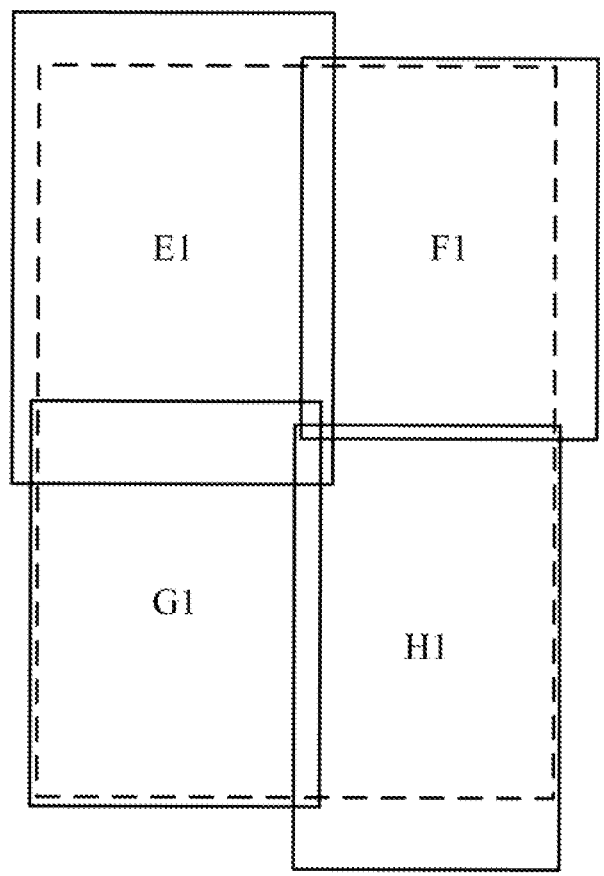
FIG. 4 illustrates a diagrammatic view of a principle in composing a number of images into a single high definition image.

In the second predetermined manner, the composing module 46 can be configured to determine overlapping portions between each two adjacent images in orientation, and stitch the images together into the high definition image according to the overlapping portions. In the embodiment, the composing module 46 can be configured to compare each two adjacent images in orientation, to determine the overlapping portions between each two adjacent images in orientation, and align the overlapping portions to obtain the high definition image. In detail, the composing module 46 can be configured to extract data from the images corresponding to the shape of one or more features appearing in the images, compare each of the extracted data between each two adjacent images in orientation to determine one or more same extracted data, and determine the one or more same extracted data to be overlapping portions between each two adjacent images in orientation. In other embodiments, the composing module 46 can be configured to align one image with neighboring images in orientation in a global coordinate system, to determine the overlapping portions between each two adjacent images taken by the capturing devices 2 in orientation, and blend the overlapping portions of each two adjacent images to obtain the high definition image. The composing module 46 can be further configured to cut the blended image in the preset manner to generate the high definition image. For example, in FIG. 4, the image E1 is taken by the capturing device E, the image F1 is taken by the capturing device F, the image G1 is taken by the capturing device G, and the image H1 is taken by the capturing device H. The composing module 46 determines the overlapping portions between adjacent images E1 and F1, adjacent images E1 and G1, adjacent images F1 and H1, and adjacent images H1 and G1 in orientation, stitches the image E1, image F1, image G1, and image H1 into a single image according to the overlapping portions, and crops the composed image by cutting the image along the dashed line to form a rectangular high definition image.

Figure 5:
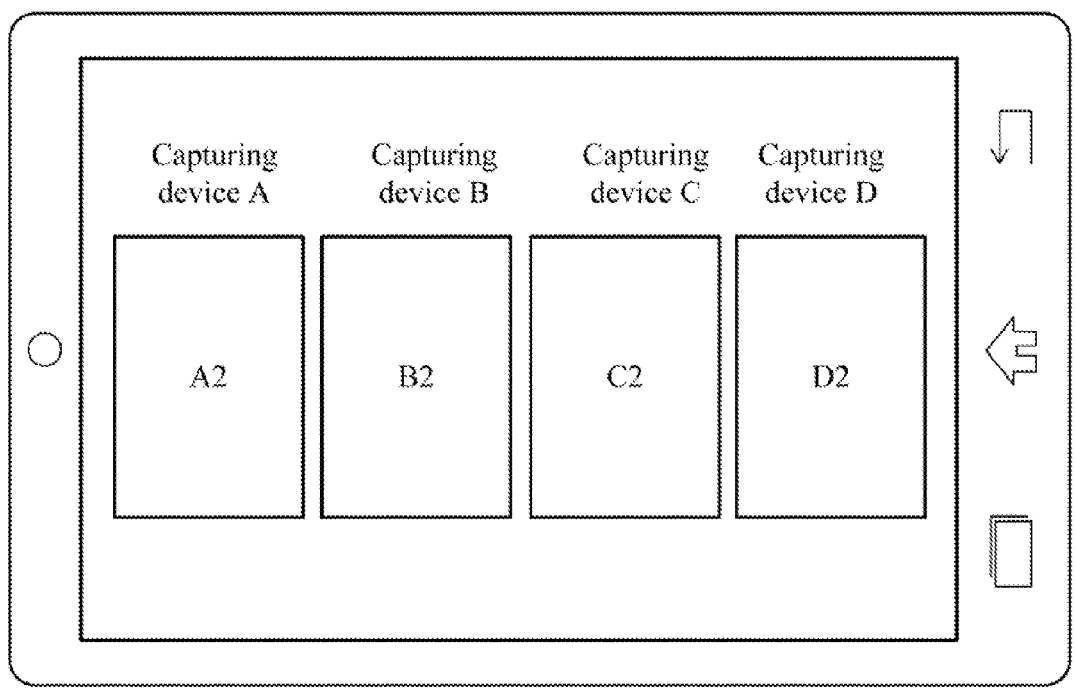
FIG. 5 illustrates a diagrammatic view of a plurality of images to be composed to a multi-angle image.
Figure 6:
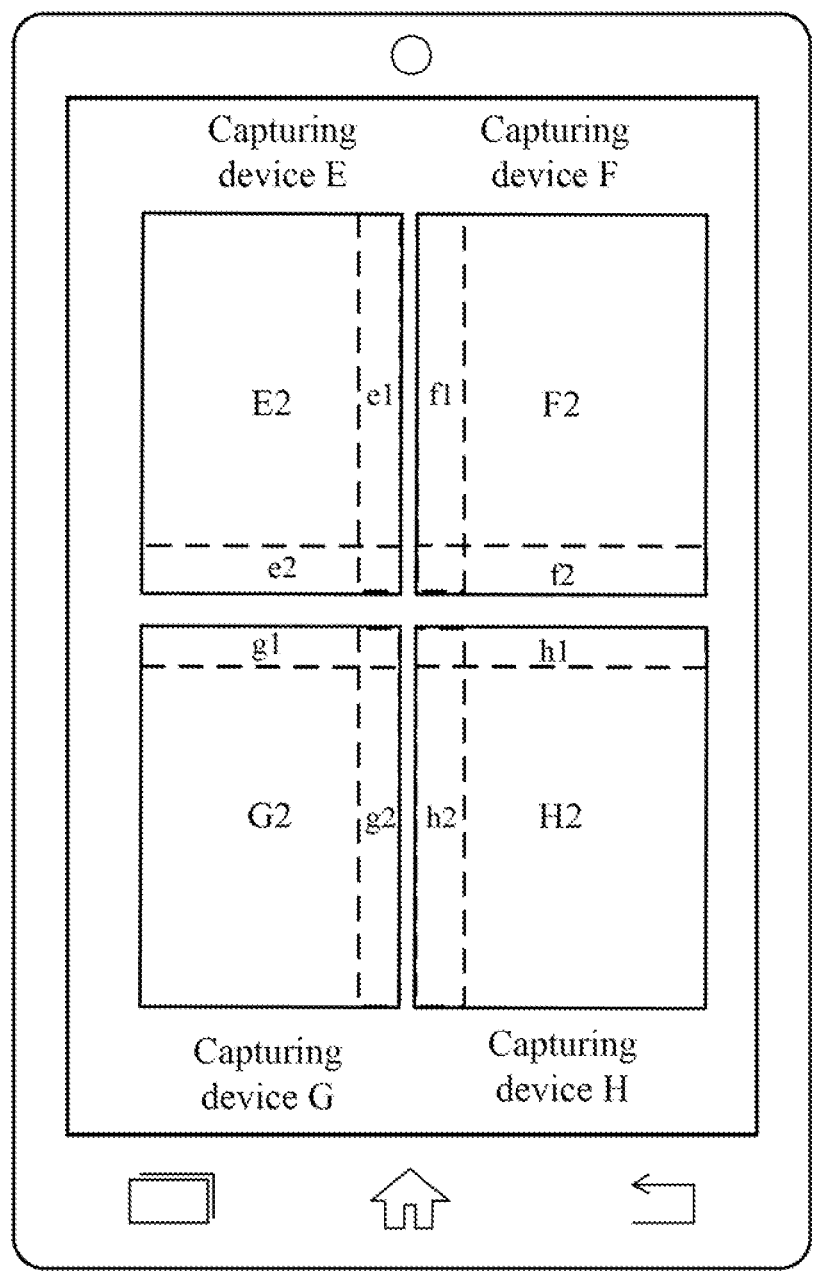
FIG. 6 illustrates a diagrammatic view of a plurality of images to be composed to a high definition image.

In the embodiment, the image composing system 40 can further include an adjusting module 47. The adjusting module 47 can be configured to adjust capturing parameter (e.g. angle of coverage or field of view) of each capturing device 2 via the communication unit 10 according to the images taken by each capturing device 2. In the embodiment, the adjusting module 47 can be further configured to control each two adjacent capturing devices 2 to transmit the captured image to each other, thus each capturing device 2 can adjust its own capturing parameter with reference to the image taken by the adjacent capturing device 2. In detail, in the first predetermined manner, the adjusting module 47 can be configured to determine a standard capturing parameter for all the capturing devices 2 according to the images taken by each capturing device 2, and adjust the capturing parameter of each capturing device 2 to the standard capturing parameter via the communication unit 10, to cause the sizes of the objects in the images taken by the capturing devices 2 to be similar to each other. For example, in FIG. 5, an image A2 is taken by the capturing device A, an image B2 is taken by the capturing device B, an image C2 is taken by the capturing device C, and an image D2 is taken by the capturing device D. The adjusting module 47 can determine a standard parameter according to the image A2, the image B2, the image C2, and the image D2, and transmit a command via the communication unit 10 to adjust the capturing parameters of the capturing devices A, B, C, and D to the standard capturing parameter. In the second predetermined manner, the adjusting module 47 can be configured to align the images taken by the capturing devices 2 in orientation, to determine which area of each image taken by the capturing devices 2 is intersected with a corresponding adjacent image taken by the capturing devices 2. The adjusting module 47 can be further configured to compare sizes of the determined areas of each two adjacent images to determine a standard capturing parameter, and adjust the capturing parameter of each capturing device 2 to the standard capturing parameter via the communication unit 10, to cause the sizes of the determined areas of each two adjacent images to be similar to each other. For example, in FIG. 6, an image E2 is taken by the capturing device E, an image F2 is taken by the capturing device F, an image G2 is taken by the capturing device G, and an image H2 is taken by the capturing device H. The adjusting module 47 determines that the areas of image E2 intersected with corresponding adjacent images F2 and G2 are respectively e1 and e2, that the areas of image F2 intersected with corresponding adjacent images E2 and H2 are respectively f1 and f2, that the areas of image G2 intersected with corresponding adjacent images E2 and H2 are respectively g1 and g2, and that the areas of image H2 intersected with corresponding adjacent images F2 and G2 are respectively h1 and h2. The adjusting module 47 compares sizes of areas e1 and f1, sizes of areas e2 and g1, sizes of areas f2 and h1, and sizes of areas g2 and h2 to determine the standard capturing parameter, and transmits a command via the communication unit 10 to adjust the capturing parameter of the capturing devices E, F, G, F, to the standard capturing parameter, to cause the sizes of areas e1 and f1 to be similar to each other, the sizes of areas e2 and g1 to be similar to each other, the sizes of areas f2 and h1 to be similar to each other, and the sizes of areas g2 and h2 to be similar to each other.

In the embodiment, the image composing system 40 can further include a sharing module 48. The sharing module 48 can be configured to share the composed image with the slave members of the sharing community 4 via the communication unit 10. In the embodiment, the sharing module 48 can be configured to share the composed image with the slave members of the sharing community 4 via the communication unit 10 in response to user operation (e.g. double clicking the composed image). In the embodiment, the sharing module 48 can be configured to transmit a sharing request to each slave member of the sharing community 4 via the communication unit 10, to request to share the composed image with each slave member of the sharing community 4. The sharing module 48 can be further configured to receive sharing feedbacks from each slave member via the communication unit 10, and transmit the composed image to the slave members which send back agreement sharing feedbacks via the communication unit 10. In other embodiments, without transmitting the sharing request to the slave members and receiving the user operation (e.g. double clicking the composed image), the second selection module 43 can directly share the composed image with the slave members of the sharing community 4 via the communication unit 10. In the embodiment, the sharing module 48 can be further configured to mark the slave members which refuse to receive the image forever, and not to share the composed image with the marked slave members in the future.

In the embodiment, each slave member of the sharing community 4 can send a receiving feedback indicating having received the composed image to the electronic device 1 upon receiving the composed image. The sharing module 48 can be further configured to determine which slave members have not received the composed image from the electronic device 1 and agree to receive the composed image from the other slave members of the sharing community 4, and, via the communication unit 10, control the slave members which have received the composed image to transmit the composed image to the slave members which have not received the composed image from the electronic device 1 and agree to receive the images from the other slave members of the sharing community 4.

Figure 7:
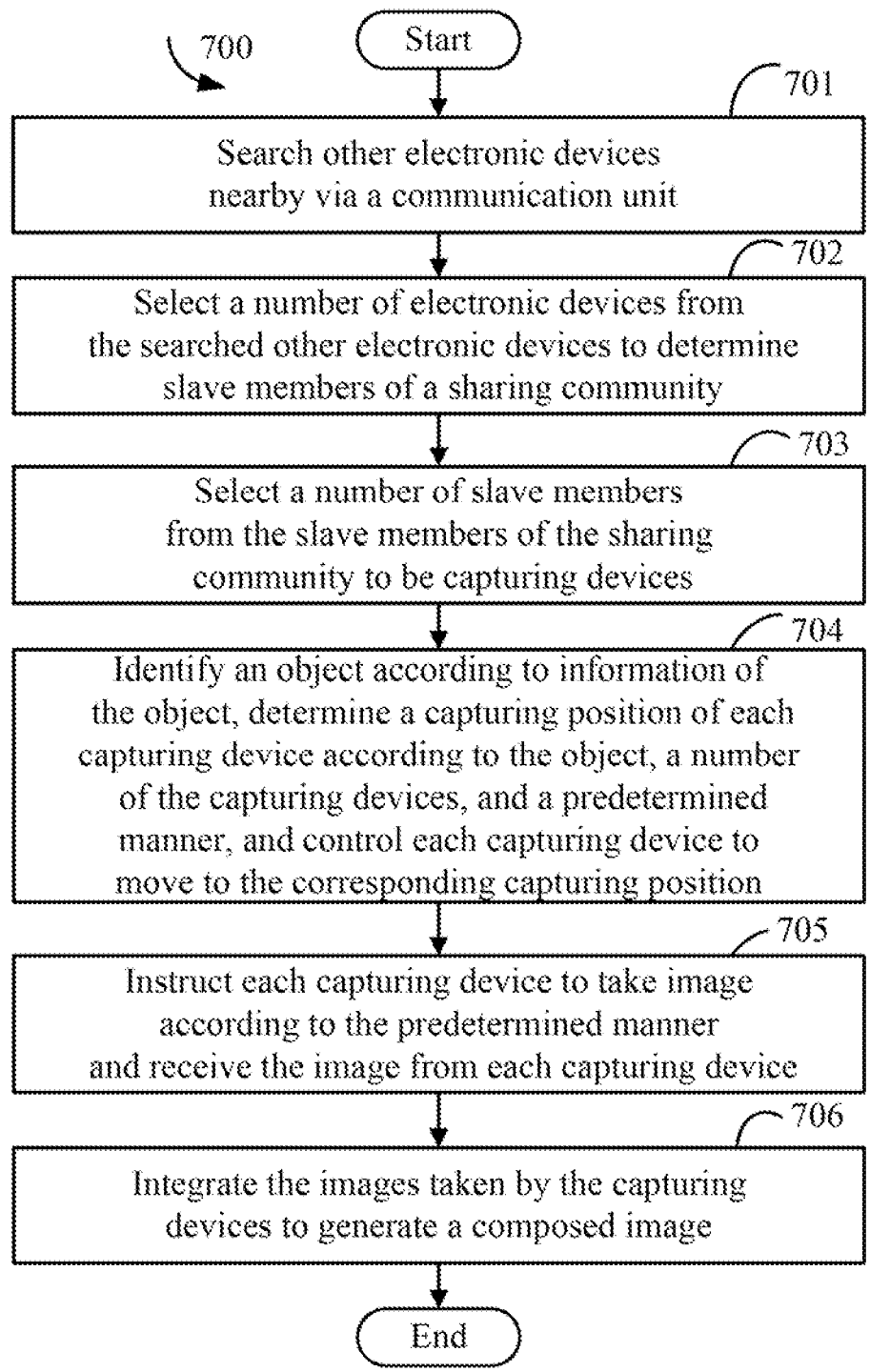
FIG. 7 illustrates a flowchart of an embodiment of an image composing method.

FIG. 7 illustrates a flowchart of an embodiment of an image composing method 700. The method 700 is provided by way of example, as there are a variety of ways to carry out the method 700. The method 700 described below can be carried out using the configurations illustrated in FIGS. 1-2, for example, and various elements of these figures are referenced in the explanation of method. Each block shown in FIG. 2 represents one or more processes, methods, or subroutines, carried out in the method. Furthermore, the illustrated order of blocks is by example only and the order of the blocks can change according to the present disclosure. Additional blocks may be added or fewer blocks may be utilized, without departing from this disclosure. The method 700 can begin at block 701.

At block 701, a searching module searches other electronic devices nearby via a communication unit.

At block 702, a first selection module selects a number of electronic devices from the searched other electronic devices to determine slave members of a sharing community. In the embodiment, the first selection module further transmits an image-receiving request including information of all the slave members of the sharing community to each slave member of the sharing community, to request all the slave members in the sharing community to receive the images from each other. The first selection module further provides options, such as agreeing option and disagreeing option, for each slave member to determine whether or not to receive the images from the other slave members of the sharing community.

At block 703, a second selection module selects a number of slave members from the slave members of the sharing community to be capturing devices.

At block 704, a control module identifies an object according to information of the object, determines a capturing position of each capturing device for each capturing device to capture the image according to the object, a number of the capturing devices, and a predetermined manner, wherein each of the capturing positions is different to create a different image. The control module further controls each capturing device to move to the corresponding capturing position via the communication unit. In the embodiment, the information of the object can be a character with some features (e.g. a girl with red clothes) who uniquely appears in the sight of the capturing devices, or an ornament or flower which uniquely appears in the sight of the capturing devices, or a location of an object near the capturing devices (e.g. a set of coordinates (300, 298)), or the like. In the embodiment, the predetermined manner can be default, or inputted, or selected by the user.

In detail, the predetermined manner can be a first predetermined manner and/or a second predetermined manner. In the first predetermined manner, the control module identifies the object according to the information of the object. The control module further divides a specific range of angles by the number of the capturing devices to determine a capturing angle of each capturing device, determines the capturing position of each capturing device according to the capturing angle of each capturing device and the object, and further controls each capturing device to move to the corresponding capturing position via the communication unit. In the second predetermined manner, the control module identifies the object according to the information of the object. The control module further divides the object by the number of the capturing devices to determine a capturing part of each capturing device, determines the capturing position of each capturing device according to the capturing part of each capturing device and the object, and further controls each capturing device to move to the corresponding capturing position via the communication unit.

At block 705, a capturing module instructs each capturing device to take the image according to the predetermined manner and receives the image from each capturing device via the communication unit. In the first predetermined manner, the capturing module instructs each capturing device to capture an image from a corresponding capturing angle via the communication unit, wherein the images taken by all capturing devices cooperatively show the object in a specific range of angles. In the second predetermined manner, the capturing module instructs each capturing device to capture an image of a certain part of the object via the communication unit, wherein the parts of the object in the images taken by all capturing devices cooperatively form an integrated whole. In the embodiment, the capturing module further transmits an image-capturing command (e.g. a command for capturing after 2 minutes) to each capturing device via the communication unit, to control each capturing device to take image simultaneously. In the embodiment, the capturing module further controls each capturing device to name the image in a default rule.

At block 706, a composing module integrates the images taken by the capturing devices to generate a composed image.

In detail, in the first predetermined manner, in the embodiment, the composing module stitches the images together with their neighboring images side by side in orientation to obtain the still multi-angle image. In the embodiment, the composing module further crops the stitched image in a preset manner to generate the still multi-angle image. In other embodiments, the composing module selects one image from all the images taken by the capturing devices, and composes the other images taken by the capturing devices sequentially in the orientation order into the selected image to form the dynamic multi-angle image.

In the second predetermined manner, the composing module determines overlapping portions between each two adjacent images in orientation, and stitches the images into the high definition image according to the overlapping portions. In the embodiment, the composing module compares each two adjacent images in orientation, to determine the overlapping portions between each two adjacent images in orientation, and aligns the overlapping portions to obtain the high definition image. In detail, the composing module extracts data from the images corresponding to the shape of one or more features appearing in the images, compares each of the extracted data between each two adjacent images in orientation to determine one or more same extracted data, and determines the one or more same extracted data to be overlapping portions between each two adjacent images in orientation. In other embodiments, the composing module aligns one image with neighboring images in orientation in a global coordinate system, to determine the overlapping portions between each two adjacent images taken by the capturing devices in orientation, and blend the overlapping portions of each two adjacent images to obtain the high definition image. The composing module further cuts the blended image in the preset manner to generate the high definition image.

In the embodiment, the method further includes:

An adjusting module adjusts capturing parameter (e.g. angle of coverage, or field of view) of each capturing device according to the images taken by each capturing device via the communication unit.

In detail, in the first predetermined manner, the adjusting module determines a standard capturing parameter for all the capturing devices according to the images taken by each capturing device, and adjusts the capturing parameter of each capturing device to the standard capturing parameter via the communication unit, to cause sizes of the objects in the images taken by the capturing devices to be similar to each other.

In the second predetermined manner, the adjusting module aligns the images taken by the capturing devices in orientation, to determine which area of each image taken by the capturing devices is intersected with a corresponding adjacent image taken by the capturing devices. The adjusting module further compares sizes of the determined areas of each two adjacent images to determine a standard capturing parameter, and adjusts the capturing parameter of each capturing device to the standard capturing parameter via the communication unit, to cause the sizes of the determined areas of each two adjacent images to be similar to each other.

In the embodiment, the method further includes:

The adjusting module controls each two adjacent capturing devices to transmit the captured image to each other via the communication unit.

In the embodiment, the method further includes:

A sharing module shares the composed image with the slave members of the sharing community via the communication unit.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device comprising:
   a communication unit configured to enable the electronic device to communicate with other electronic devices;
   a processor; and
   a non-transitory computer readable medium storing instructions to cause the processor to:
      search other electronic devices nearby via the communication unit;
      select a plurality of electronic devices from the searched other electronic devices to determine slave members of a sharing community;
      select a plurality of slave members from the slave members of the sharing community to be capturing devices for capturing images of an object;
      identify the object and determine a capturing position of each of the capturing devices for each of the capturing devices to capture the images according to the object, the number of the capturing devices, and a predetermined manner, wherein each of the capturing positions is different to create a different image;
      control each of the capturing devices to move to the corresponding capturing position via the communication unit;
      instruct each of the capturing devices to take one of the images according to the predetermined manner via the communication unit and receive the images from each of the capturing devices via the communication unit; and
      integrate the images taken by the capturing devices to generate a composed image.

2. The electronic device as described in claim 1, further storing instructions to cause the processor to:
   adjust a capturing parameter of each of the capturing devices according to the images taken by each of the capturing devices via the communication unit.

3. The electronic device as described in claim 1, further storing instructions to cause the processor to:
   share the composed image with the slave members of the sharing community via the communication unit.

4. The electronic device as described in claim 1, wherein the predetermined manner comprises a first predetermined manner, in the first predetermined manner, the processor is caused to instruct each of the capturing devices to take one of the images of the object from a different angle via the communication unit, wherein the images taken by all of the capturing devices cooperatively show the object in a specific range of angles, thereby a multi-angle image is obtained as the composed image in the first predetermined manner.

5. The electronic device as described in claim 4, wherein the multi-angle image comprises a still multi-angle image and the processor is further caused to:
   stitch the images together with their neighboring images side by side in orientation to obtain the still multi-angle image.

6. The electronic device as described in claim 4, wherein the multi-angle image comprises a dynamic multi-angle image and the processor is further caused to:
   select one image from all of the images taken by the capturing devices and compose the other images taken by the capturing devices sequentially in the orientation order into the selected image to form the dynamic multi-angle image.

7. The electronic device as described in claim 1, wherein the predetermined manner comprises a second predetermined manner, in the second predetermined manner, the processor is caused to control each of the capturing devices to capture a different part of the object via the communication unit, wherein the parts of the object in the images taken by all of the capturing devices cooperatively form an integrated whole, thereby a high definition image is obtained as the composed image in the second predetermined manner.

8. The electronic device as described in claim 7, wherein the processor is caused to:
   determine overlapping portions between each two adjacent images in the images captured by the capturing devices in orientation, and stitch the images captured by the capturing devices together to obtain the high definition image according to the overlapping portions.

9. An image composing method comprising:
   searching other electronic devices nearby via a communication unit;
   selecting a plurality of electronic devices from the searched other electronic devices to determine slave members of a sharing community;
   selecting a plurality of slave members from the slave members of the sharing community to be capturing devices for capturing images of an object;
   identifying the object and determining a capturing position of each of the capturing devices for each of the capturing devices to capture the images according to the object, the number of the capturing devices, and a predetermined manner, wherein each of the capturing positions is different to create a different image;
   controlling each of the capturing devices to move to the corresponding capturing position via the communication unit;
   instructing each of the capturing devices to take one of the images according to the predetermined manner via the communication unit and receiving the images from each of the capturing devices via the communication unit; and
   integrating the images taken by the capturing devices to generate a composed image.

10. The image composing method as described in claim 9, wherein the predetermined manner comprising a first predetermined manner, in the first predetermined manner, the method further comprises:
    instructing each of the capturing devices to take one of the images of the object from a different angle via the communication unit, wherein the images taken by all of the capturing devices cooperatively show the object in a specific range of angles, thereby a multi-angle image is obtained as the composed image in the first predetermined manner.

11. The image composing method as described in claim 10, wherein the multi-angle image comprises a still multi-angle image and the method further comprises:
    stitching the images together with their neighboring images side by side in orientation to obtain the still multi-angle image.

12. The image composing method as described in claim 10, wherein the multi-angle image comprises a dynamic multi-angle image and the method further comprises:
    selecting one image from all of the images taken by the capturing devices and composing the other images taken by the capturing devices sequentially in the orientation order into the selected image to form the dynamic multi-angle image.

13. The image composing method as described in claim 9, wherein the predetermined manner comprises a second predetermined manner, in the second predetermined manner, the method further comprises:

instructing each of the capturing devices to capture a different part of the object via the communication unit, wherein the parts of the object in the images taken by all of the capturing devices cooperatively form an integrated whole, thereby a high definition image is obtained as the composed image in the second predetermined manner.

14. The image composing method as described in claim 13, wherein the method further comprises:
determining overlapping portions between each two adjacent images in the images captured by the capturing devices in orientation, and stitching the images captured by the capturing devices together to obtain the high definition image according to the overlapping portions.

15. A non-transitory storage medium storing a set of instructions, the set of instructions capable of being executed by a processor of an electronic device and causing the electronic device to perform an image composing method, the method comprising:
searching other electronic devices nearby via a communication unit;
selecting a plurality of electronic devices from the searched other electronic devices to determine slave members of a sharing community;
selecting a plurality of slave members from the slave members of the sharing community to be capturing devices for capturing image of an object;
identifying the object and determining a capturing position of each of the capturing devices for each of the capturing devices to capture the images according to the object, the number of the capturing devices, and a predetermined manner, wherein each of the capturing positions is different to create a different image;
controlling each of the capturing devices to move to the corresponding capturing position via the communication unit;
instructing each of the capturing devices to take one of the images according to the predetermined manner via the communication unit and receiving the images from each of the capturing devices via the communication unit; and
integrating the images taken by the capturing devices to generate a composed image.

16. The non-transitory storage medium as described in claim 15, wherein the predetermined manner comprising a first predetermined manner, in the first predetermined manner, the method further comprises:
instructing each of the capturing devices to take one of the images of the object from a different angle via the communication unit, wherein the images taken by all of the capturing devices cooperatively show the object in a specific range of angles, thereby a multi-angle image is obtained as the composed image in the first predetermined manner.

17. The non-transitory storage medium as described in claim 16, wherein the multi-angle image comprises a still multi-angle image and the method further comprises:
stitching the images together with their neighboring images side by side in orientation to obtain the still multi-angle image.

18. The non-transitory storage medium as described in claim 16, wherein the multi-angle image comprises a dynamic multi-angle image and the method further comprises:
selecting one image from all of the images taken by the capturing devices and composing the other images taken by the capturing devices sequentially in the orientation order into the selected image to form the dynamic multi-angle image.

19. The non-transitory storage medium as described in claim 15, wherein the predetermined manner comprises a second predetermined manner, in the second predetermined manner, the method further comprises:
instructing each of the capturing devices to capture a different part of the object via the communication unit, wherein the parts of the object in the images taken by all of the capturing devices cooperatively form an integrated whole, thereby a high definition image is obtained as the composed image in the second predetermined manner.

20. The non-transitory storage medium as described in claim 19, wherein the method further comprises:
determining overlapping portions between each two adjacent images in the images captured by the capturing devices in orientation, and stitching the images captured by the capturing devices together to obtain the high definition image according to the overlapping portions.

* * * * *